April 5, 1932.  G. RAYMOND  1,852,372
FLOAT CONSTRUCTION
Filed March 24, 1930
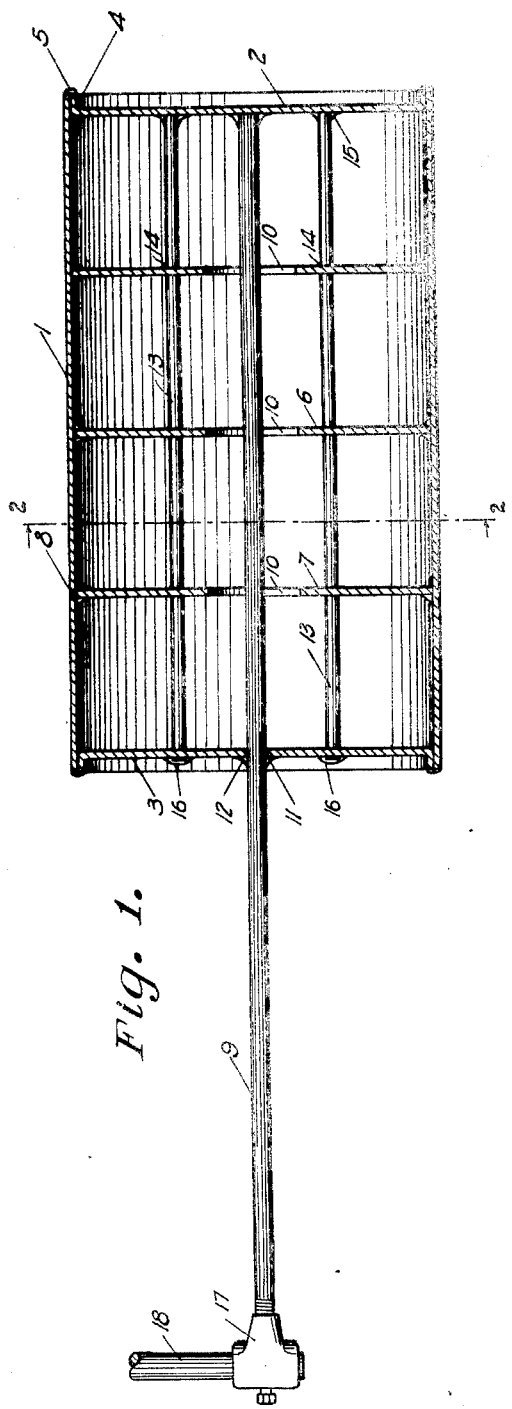
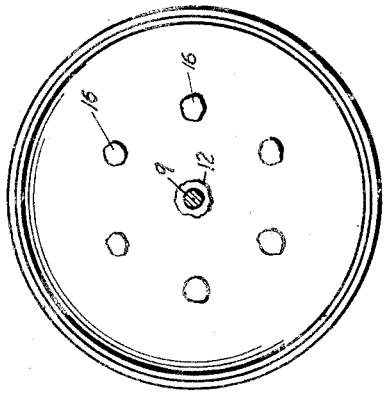
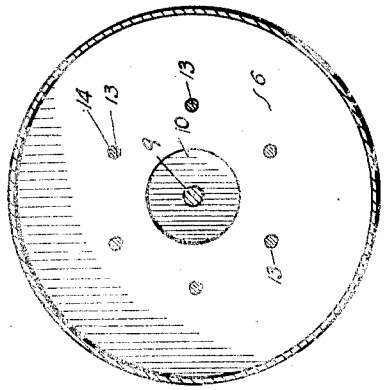
*INVENTOR*
Gwynne Raymond
BY Arthur C. Brown
*ATTORNEY*

Patented Apr. 5, 1932

1,852,372

UNITED STATES PATENT OFFICE

GWYNNE RAYMOND, OF KANSAS CITY, MISSOURI

FLOAT CONSTRUCTION

Application filed March 24, 1930. Serial No. 438,423.

My invention relates to floats and more particularly to inside floats subject to relatively great pressures and external strains. Floats of this character may be required to move valve-operating shafts rotatively and to transmit a large amount of torque to a rotatable shaft, thus putting relatively great strain on the float rod and incurring danger of damage to the rod and disconnection of the rod from the float when the buoyant force of the float is communicated to the rod.

Among the requirements of a float adapted to transmit a relatively large amount of torque, are that it have a large displacement volume, and the walls of the float are liable to distortion and rupture when subjected to pressures and strains.

The principal objects of my invention therefore are to enable a float to resist relatively great pressures and strains, to reenforce a float having relatively large displacement volume, to strengthen the connection between a float rod and a float, to assure transmission of a large amount of torque to a rotatable shaft, and to assure accurate and uninterrupted operation of rotative shafts by inside floats.

In accomplishing these and other objects of the invention, I have provided improved details of structure, the preferred form of which are illustrated in the accompanying drawings, wherein:

Fig. 1 is a longitudinal central section of my improved float and a float rod attached thereto in accordance with my invention, a rotative shaft being shown fragmentarily.

Fig. 2 is a cross section on the line 2—2, Fig. 1.

Fig. 3 is a front end view of the float, the rod being shown in section.

Referring in detail to the drawings:

1 designates a float body comprising a cylinder having a relatively large displacement volume, and having opposite ends sealingly closed by a rear diaphragm or head 2 and a front head 3.

The cylinder preferably comprises a rolled plate forming a shell and having a welded longitudinal seam. The heads comprise rolled disks having flanges 4 preferably outbent and adapted to engage the inner surface of the shell and lie flush with the end edges of the shell, and are fixed thereto by welding 5 applied to the registering edges of the flanges and shell. The disk bodies of the heads are therefore spaced inwardly from the end edges of the shell.

Mounted in the shell is a reenforcing diaphragm 6 having a periphery engaged with the inner surface of the shell, and preferably comprising a circular disk fitting snugly therein. Additional similar diaphragms such as 7 are also preferably installed in suitably spaced relation and at suitable positions to stiffen and adequately reenforce the shell. The diaphragms are secured to the shell by suitable means, such as welding 8.

A float rod or stem 9 has its rear end welded to the inner face of the rear head at the axis thereof, and extends through openings 10 in the intermediate diaphragms and an aperture 11 in the front head. The rod is sealingly engaged in said aperture and attached to the front head by welding 12.

The rod is thus securely connected to opposite walls of the float and the centrally located float-contained portion of the rod forms a rigid shell-reenforcing member having an exterior extension comprising the operating portion of the rod.

A plurality of bracing rods 13 extend longitudinally in the shell, through apertures 14 in the diaphragms, and have rear ends abutting the inner face of the rear head and welded thereto as indicated at 15.

The rods 13 extend into and preferably through suitable openings in the front head, and are attached thereto in sealing relation by welding 16.

The outer end of the float rod may be fixed in a coupling 17 keyed to a rotative shaft 18 whereby vertical movement of the float may effect rotative movement of the shaft to operate a valve or the like.

In assembling a device having parts as above described, a diaphragm or diaphragms nearest to the center of the shell are first welded thereto to fix the same for stiffening the float. Additional diaphragms are then mounted in the shell progressively from the center toward each head, and fixed to the shell by welding.

The front head is then welded to the outer end of the shell.

The float rod and stiffening rods are welded to the rear head to form a rear head assembly. The rods are passed through the openings in the diaphragms and front head to seat the rear head in the shell, and the rear head is welded to the shell. Welding is then applied to secure the rods to the front head, and form a rigidly connected assembly.

The float rod may then be fixed in the coupling, and the coupling mounted on the valve-operating shaft.

A float constructed as described may have a relatively large displacement volume, but will be stiffened and reenforced by the diaphragms and longitudinal rods to resist crushing, distorting or collapsing pressures, which otherwise might cause leakage or reduction in volume. The float therefore provides a greater margin of assurance of action, and assured positive action of valves in spite of adverse conditions such as sand clogging, ice formation and the like.

The buoyant force of the float will be communicable to the float rod and shaft without danger of twisting, bending or breaking the rod, since the rod passes through the float and is fastened to both heads.

What I claim and desire to secure by Letters Patent is:

1. In a float construction, an elongated cylindrical shell, heads comprising disks having flanges fixed to the inner surfaces of the shell, and a stem extending through one head on the axis of the shell and fixed to both heads.

2. In a float construction, a shell, a plurality of apertured diaphragms fixed to the inner surface of the shell, front and rear heads fixed to the shell, and a stem extending through the front head and aperture of the diaphragm, and having a rear end fixed to the inner face of the rear head and an intermediate portion fixed to the front head.

3. In a float construction, a shell, front and rear heads fixed to the shell, stiffening rods extending in the shell and fixed to the heads, and a stem extending through the front head and having a rear end fixed to the rear head and an intermediate portion fixed to the front head.

4. In a float construction, a cylindrical shell, an apertured diaphragm fixed to the inner surface of the shell, front and rear heads fixed to the shell, stiffening rods extending in the shell and fixed to the heads, and a stem extending through the front head and diaphragm into the shell and having a rear end fixed to the rear head and an intermediate portion fixed to the front head.

5. A device of the character described comprising a cylindrical shell, disks having flanges fixed to the end edges of the shell forming respectively a rear head and a front head, a plurality of apertured diaphragms fixed to the inner surface of the shell for stiffening the shell against lateral pressures, a longitudinal stiffening rod extending through selected apertures of the diaphragms and fixed to the heads, and a stem extending through axial apertures in the diaphragms and through the front head and fixed to the heads.

6. A device of the character described comprising a cylindrical shell, disks having outbent flanges fixed to the end edges of the shell forming respectively a rear head and a front head, a plurality of apertured diaphragms fixed to the inner surface of the shell for stiffening the shell against lateral pressures, a longitudinal stiffening rod extending through selected apertures of the diaphragms and fixed to the heads, and a stem extending through the diaphragms and fixed to the heads.

7. A device of the character described comprising a cylindrical shell, disks having outbent flanges fixed to the end edges of the shell forming respectively a rear head and a front head, said front head being apertured, a plurality of apertured diaphragms fixed to the inner surface of the shell for stiffening the shell against lateral pressures, a longitudinal stiffening rod extending through selected apertures of the diaphragms through an aperture of the front head and fixed to the heads, and a stem extending through axial apertures in the diaphragms and through an axial aperture of the front head and fixed to the heads.

8. In a float construction, a shell, a plurality of diaphragms fixed to the inner surface of the shell, reenforcing rods mounted in said diaphragms, and a float rod fixed to one of said diaphragms.

9. In a float construction, a shell, a plurality of diaphragms fixed to the shell, reenforcing rods having portions fixed to selected diaphragms, and a stem fixed to one of said diaphragms.

10. In a float construction, a shell, an imperforate diaphragm fixed to one end of the shell, an apertured diaphragm fixed to the opposite end of the shell, and a rod having an outer end portion mounted in the aperture of the last named diaphragm and an inner end fixed to the imperforate diaphragm.

In testimony whereof I affix my signature.

GWYNNE RAYMOND.